United States Patent [19]

Caccoma et al.

[11] 4,027,246

[45] May 31, 1977

[54] AUTOMATED INTEGRATED CIRCUIT MANUFACTURING SYSTEM

[75] Inventors: George Anthony Caccoma; Paul Philip Castrucci, both of Poughkeepsie; William Otto Druschel, Granite Springs, all of N.Y.

[73] Assignee: International Business Machines Corporation, Armonk, N.Y.

[22] Filed: Mar. 26, 1976

[21] Appl. No.: 670,596

[52] U.S. Cl. ............................ 235/151.1; 29/430; 29/563; 198/339; 340/172.5; 444/1
[51] Int. Cl.² ...................................... G06F 15/46
[58] Field of Search ............ 235/151, 151.1; 444/1; 340/172.5; 29/430, 208 C, 569, 563; 198/19; 302/2 R Primary Examiner—Felix D. Gruber
Attorney, Agent, or Firm—Wesley DeBruin

[57] ABSTRACT

A computer controlled manufacturing system employing random access semiconductor wafer storage in the fabrication of integrated circuit devices.

A computer controlled manufacturing system for fabricating semiconductor wafers into large scale integrated circuit devices and wherein each semiconductor wafer has scored, or recorded thereon, distinct identifying indicia, such as a machine readable serial number. A plurality of concurrently operable semiconductor wafer processing stations are independently computer controlled. Each of the stations performing at least one discrete fabrication step. The manufacturing system including random access wafer storage means having n storage cells, each of said storage cells being adapted to store at least one semiconductor wafer, each of said n storage cells of said random access storage means being individually and randomly addressable under computer control to receive for storage in any predetermined one of said n storage cells a semiconductor wafer, or to provide from storage in any predetermined one of said n storage cells a semiconductor wafer. Reading means for reading the identifying indicia on said semiconductor wafers. Conveying means operative under computer control, said conveying means interconnecting said plurality of computer controlled concurrently operable semiconductor wafer processing stations, and said random access storage means, said conveying means being adapted to convey predetermined wafers to and from said random access storage means and selected ones of said processing stations. A digital computer system operable under stored program control means, said computer system being interconnected with and controlling said processing stations, said random access storage means, said reading means and said conveying means, whereby under computer control selected ones of said semiconductor wafers randomly stored in said random access storage means may be selected and fabricated into first part number large scale integrated circuit devices, and selected second ones of said semiconductor wafers randomly stored in said random access storage means may be selected and fabricated into second part number large scale integrated circuit devices, where said first and second part number devices are not identical.

8 Claims, 4 Drawing Figures

WAFER MANUFACTURING SYSTEM OF FIG. 1 OF US PATENT NO. 3,889,355, WITH WAFER ORDERBOOK BUFFER MIX CAPABILITY

AUTOMATED INTEGRATED CIRCUIT MANUFACTURING SYSTEM

BACKGROUND OF THE INVENTION AND PRIOR ART

In the electronic component manufacturing industry, integrated circuits and other devices are typically fabricated in the form of slices, or wafers, of semiconductor material such as silicon, germanium or the like. Each of the slices contain a large number of individual circuits. The integrated circuits, as is well known in the art, maybe formatted or arranged on the wafer to facilitate subsequent dicing of the wafer into a sizeable number of integrated circuit chips.

Batch processing techniques have heretofore been employed in the fabrication of semiconductor wafers into integrated circuits. The practice of batch processing has numerous shortcomings. Not the least of which is the total elapsed time necessary to produce a finished slice. Long cycle times increase product cost. For example, when the cycle time for a process is longer than the backlog of orders for products produced by the process, it is necessary to forecast product orders and to begin the production of integrated circuit devices based thereon. In the forecast and production schedule are not reasonably in accord either a failure to meet delivery schedules results (customer dissatisfaction) or costly inventory is produced. Long cycle times are undesirable for numerous additional reasons known to the art. For example, in a batch process manufacturing system, a sizeable quantity of sub-standard, defective, or useless fully or partially completed product may be produced during the period between a failure and the introduction of an effective correction of the failure. A still further problem that results from the use of batch processing techniques is the deterioration of semiconductor wafers during the manufacturing process. The deterioration of the semiconductor wafers being due in large part to the repeated, human or machine handling of the wafers, the time duration of the complete process, and the relatively impossible task of processing the wafers through all steps of the system at the same rate. Namely, the accumulation of wafers between the faster and slower portions of the batch process manufacturing system and different times between such accumulation can frequently result in less uniform electrical characteristics of the product.

To obviate the problems of batch processing and efficiently produce high circuit density integrated circuit devices the art has gone in the direction of automating the production of integrated circuit devices.

Reference is made to U.S. Pat. No. 3,765,763, entitled "Automatic Slice Processing" granted Oct. 16, 1973. U.S. Pat. No. 3,765,763 discloses an electronic manufacturing system, wherein semiconductor slices are transported in serial fashion between a plurality of work stations. As the slices move through the system, each work station performs a separate manufacturing operation on each slice. The manufacturing operations are performed in immediate succession and within the same time interval so that the slices are processed rapidly and do not accumulate between the work stations. The slices are maintained in sequence throughout the system so that the operation of the system is more easily controlled.

In U.S. Pat. No. 3,765,763, the manufacturing system is computer controlled, the semiconductor slices are numbered and are operated on in sequence through the entire system. Each work station of the system performs its respective manufacturing operation within an optimum period of time so that slices do not accumulate at any point in the system.

Reference is made to U.S. Pat. No. 3,845,286, entitled "Manufacturing Control System For Processing Work Pieces" granted Oct. 29, 1974 to Messrs. Jesse Aronstein, W. E. Harding, and P. M. Zeiss, and to U.S. Pat. No. 3,889,355, entitled "Continuous Processing System" granted June 17, 1975 to Jesse Aronstein and Willian E. Harding. These patents disclose a manufacturing system and control system for the manufacturing line, where the manufacturing system utilizes a plurality of satellite functional processing stations or sectors, each capable of stand-alone operation. The wafer processing stations are interconnected by a wafer handler or conveyor which transports individual ones of the semiconductor wafers from one process sector to the next in response to the control system, so that the wafers will be sequenced through a prescribed sequence of sectors corresponding to the processing requirements for the semiconductor wafers.

Reference is made to U.S. Pat. No. 3,850,105, entitled "Apparatus for Transferring Articles Through Various Processing Sectors of a Manufacturing System" granted Nov. 26, 1974 to Jesse Aronstein, Arkady Leoff, John J. Murphy and Winfield S. Ruder. Disclosed is wafer handling and transport apparatus having particular utility when employed in a manufacturing system generally of the type disclosed in U.S. Pat. No. 3,889,355.

Reference is made to IBM Technical Disclosure Bulletin publication entitled "Pneumatic Distribution and Control System" by P. P Castrucci, Vol. 15, No. 6, November 1972, pages 1763 and 1764. The product control management system discussed in the IBM TDB publication is useful in the manufacture of large-scale integrated circuits. The system utilizes a computer automated, pneumatic transport hardware system to distribute and control the flow of semiconductor wafers through a manufacturing process environment. The system is designed for optimum product flow controlled via computer activation. The wafers are loaded into capsule cylinders which are directed between process sectors via pneumatic transport tubes. The outside of the cylinders are magnetic coated for recording product control information, such as process directions and fabrication data. The work in process is maintained at a smooth flow utilizing novel rotating inventory storage units.

The following publications and patents may be considered representative of the art disclosing the employment of a serial number, or other identifying indicia, on semiconductor wafers.

IBM Technical Disclosure Bulletin, entitled "Decoding and Encoding for Product Identification" by R. R. Jorgensen, Vol. 14, No. 4, September 1971, pages 1023 to 1025; IBM Technical Disclosure Bulletin, entitled "Identification of Wafers by Marginal Binary Notching and Template" by J. S. Jackson and W. E Wright, Vol. 15, No. 7, December 1972, pages 2773, 2774; U.S. Pat. No. 3,597,045, entitled "Automatic Wafer Identification System and Method" granted Aug. 3, 1971 to Einar S. Mathisen on application Ser. No. 837,765, filed June 30, 1969; U.S. Pat. No. 3,558,899 entitled "System and Method for Using Numerically Coded Etched Inidicia for Identification of Pieces of Semiconductor Material" granted Jan. 26, 1971 to Mark Morgan and Hans R. Rottmann on application Ser. No. 759,257, filed Aug. 30, 1968; and U.S. Pat. No. 3,562,536, entitled "Radiation Sensitive Semiconductor Wafer Identification System" granted Feb. 9, 1971 to Rolf H. Brunner and Ollie C. Woodard, on application Ser. No. 756,540 filed Aug. 30, 1968.

Reference is made to U.S. Pat. No. 3,976,330 granted Aug. 24, 1976 to J. P. Babinski et al., Ser. No. 618,654, entitled "Transport System for Semiconductor Wafer Multiprocessing Station System", filed Oct. 1, 1975, and of common assignee.

U.S. Pat. No. 3,976,330 discloses a dual bidirectional minimum volume self-centering air tract system for transporting semiconductor wafers or geometrically similar parts-in-process to and from processing tool stations in a random type manner and embodying controls to identify and collect treated wafers in segregated lots. The enclosed system is at a positive pressure to avoid ambient contamination. Said enclosed track system further embodies a means for the combined computerized control of individual wafer routing in the system, humidity, temperature, and particulate content of the fluid within and utilized by the transport system while supplying and receiving wafers to processing tool stations which may have a wide variation of ambient conditions. Further said transport system embodies among other features means for bidirectional travel with cross over intersections, directional control means, buffer sections and fluid vector means from a lower plenum for maintaining wafers centered on a fluidic cushion track so as to avoid edge contact of the wafer against any part of the apparatus and minimal backside or back flat face contact with the track membrane. The system also provides a means for sending wafers into the system and collecting processed pieces in suitable containers in lot or random form.

Reference is made to U.S. patent application Ser. No. 618,655, entitled "Fluidic Transport Intersection" filed Oct. 1, 1975 by J. P. Babinski, and of common assignee herewith.

U.S. patent application Ser. No. 618,655 discloses an apparatus and method for providing automatic or semiautomatic interconnections and intersections in a fluidic transportation system. In particular the teaching relates to the transportation of semiconductor wafers or slices between processing stations on a dual highway type system utilizing a fluidic cushion means whereby said wafers can be processed in a random manner and transported under a controlled environment dissimilar to the processing environment. However, the track, and system may be constructed into a multiplicity of configurations and is not limited to a dual or single track system.

The following publications and patents may be considered representative of the art disclosing apparatus for conveying, transporting, storing, positioning, processing, etc. semiconductor wafers.

U.S. Pat. No. 3,850,105, entitled "Apparatus for Transferring Articles Through Various Processing Sectors of A Manufacturing System," granted Nov. 26, 1974 to Jesse Aronstein, Arkady Leoff, John J. Murphy and Winfield S. Ruder on application Ser. No. 319,563, filed Dec. 29, 1972. U.S. Pat. No. 3,588,176, entitled "Article Transport System and Method", granted June 28, 1971 to Thomas M. Byrne and Arkady Leoff on Ser. No. 775,457, filed Nov. 13, 1968. U.S. Pat. No. 3,603,646, entitled "Semiconductor Wafer Air Slide with Controlled Wafer Motion", granted Sept. 7, 1971 to Arkady Leoff on application Ser. No. 5,454 filed Jan. 26, 1970. U.S. Pat. No. 3,649,081 entitled "Fluid Vibration Transport System", granted Mar. 14, 1972 to Robert Allen Johnson, Ervin H. Richards and Roy H. A. Watson on Ser. No. 108,815 filed Jan. 22, 1971. U.S. Pat. No. 3,625,384, entitled "Article Handling Device," granted Dec. 7, 1971 to Frank E. Boerger, Carlo Nuccio and Charles A. Rosboschil on application Ser. No. 762,896 file Sept. 26, 1968. U.S. Pat. No. 3,631,758, entitled "Process for Grooving Fluid-Bearing Bars, and Resulting Articles" granted Jan. 4, 1972 to Cecil A. Lasch, Jr. on application Ser. No. 852,216, filed Aug. 22, 1969. U.S. Pat. No. 3,645,581, entitled "Apparatus and Method for Handling and Treating Articles", granted Feb. 29, 1972 to Cecil A. Lasch, Jr., George H. Bingham, Gerhard Berz and Earl G. Troyer on application Ser. No. 779,033, filed Nov. 26, 1968. U.S. Pat. No. 3,675,563, entitled "Semiconductor Processing Apparatus", granted July 11, 1972 to Claude G. Metreaud, on application Ser. No. 3,162, filed Jan. 15, 1970 U.S. Pat. No. 3,706,475, entitled "Air Slides", granted Dec. 19, 1972 to Carl yakubowski, on application Ser. No. 128,277, filed Mar. 29, 1971. U.S. Pat. No. 3,707,944, entitled "Automatic Photoresist Apply and Dry Apparatus" granted Jan. 2, 1973, to Forrest Robert Grundon, Frank Harrison Masterson, Robert John Wagler and Fred Ernest Wustrau, on application Ser. No. 83,401, filed Oct. 23, 1970. U.S. Pat. No. 3,718,371, entitled "Fluid Bearing Track Structure and Components Thereof", granted Feb. 27, 1973 to Cecil A. Lasch Jr. on application Ser. No. 174,808, filed Aug. 25, 1971. U.S. Pat. No. 3,731,823, entitled "Wafer Transport System", granted May 8, 1973 to George R. Goth on application Ser. No. 148,731, filed June 1, 1971. U.S. Pat. No. 3,747,753, entitled "Fluid Bearing Apparatus and Method for Handling and Gaging Articles", granted July 24, 1973 to Alan G. Flint on application Ser. No. 220,336 filed Jan. 24, 1972. U.S. Pat. No. 3,785,027, entitled "Method of Producing Fluid Bearing Track Structure", granted Jan. 15, 1974 to Cecil A. Lasch, Jr. on application Ser. No. 280,273, filed Aug. 14, 1972. U.S. Pat. No. 3,853,313, entitled "Wafer Interlocking Transport", granted Dec. 10, 1974 to Henry Albert Appenzeller, Joseph Charles Miller and Vincent Shea on application Ser. No. 398,292 filed Sept. 17, 1973. U.S. Pat. No. 3,272,350, entitled "Method and Apparatus for Semiconductor Wafer Handling" granted Sept. 13, 1966 to Theodore Patrick, Peter E. Pflaumer and John W. Philbrick on application Ser. No. 399,200 filed Sept. 25, 1964. IBM TDB publication entitled "Transport of Substrates for Multilayer Deposition in a Vacuum" by B. I. Bertelsen, B. H. Parrish and G. Worthington, Vol. 10, No. 3, Aug. 1967, pages 198 and 199. IBM Technical Disclosure Bulletin Publication, entitled "Precision Wafer Orientation and Transfer System", by R. R. Jorgensen and H. A. Klein, Vol. 16, No. 9, February 1974, pages 2910 and 2911. U.S. Pat. No. 3,730,595, entitled "Linear Carrier Sender and Receiver" granted May 1, 1973 to Carl Yakuboski on application Ser. No. 203,374, filed Nov. 1, 1971.

IBM Technical Disclosure Bulletin publication, entitle "Vertical Wafer Storage System" R. J. Paul, W. S. Ruder and L. Sartorio, Vol. 16, No. 12, May 1974, pages 3917 and 3918.

IBM Technical Disclosure Bulletin publication, entitled "Wafer Loader/Unloader" by A. H. Bachmann and A. Kostenko, Jr., Vol. 17, No. 10, March 1975, pages 2908 and 2909.

IBM Technical Disclosure Bulletin publication, entitled "Article Handling System" by C. G. Metreand, Vol. 9, No. 7, December 1966 pages 953 and 954.

IBM Technical Disclosure Bulletin publication, entitled "Automatic Loading of Oxidation Boats" by G. R. Goth and R. B. Jerard, Vol. 14, No. 4, September 1971, page 1198.

IBM Technical Disclosure Bulletin publication, entitled "Air Track Buffer" by J. P. Babinski, Vol. 16, No. 2, July 1973, pages 469 and 470.

ADDITIONAL WAFER HOLDING STRUCTURES

U.S. Pat. No. 3,766,046 entitled "Jig Holder for Clamping Articles in Place During Treatment Thereof" granted Oct. 16, 1973 to Alan G. Flint on application Ser. No. 237,409 filed Mar. 23, 1972.

IBM TDB publication entitled "Semiconductor Wafer Alignment Fixture" by V. J. Delgado, Vol. 10, No. 6, November 1967 pages 828 and 829.

IBM TDB publication entitled "Foam Pad Shock Absorber" by R. H. Bouvier, H. J. Nolting and J. A. Parent, Vol. 14, No. 1, June 1971, page 88.

IBM TDB publication entitled "Etch Boat for Wafers" By R. M. DeFries, Vol. 14, No. 10, March 1972, page 2908.

U.S. Pat. No. 3,923,342 entitled "Apparatus and Method for Handling Frangible Objects" granted Dec. 2, 1975 to Frank Michael Shannon on Application Ser. No. 477,572, filed June 10, 1974.

Reference is made to the IBM Technical Disclosure Bulletin publication entitled "Photomask Input/Output System" J. F. Collins, L. S. Foscaldi, R. G. Walker and M. Waian, Vol. 15, No. 10, March 1973, pages 3064 and 3065.

SUMMARY OF THE INVENTION

The semiconductor wafer orderbook mix buffer is an automated production control system for wafer handling, sorting and storage. The wafer orderbook mix buffer may be integrally employed as a sector in a multi-sectored automated wafer fabricator. Automated wafer fabricator systems are well-known in the art. For example, the automated wafer fabricator may be generally of the type disclosed in U.S. Pat. Nos. 3,765,763, 3,845,286 and 3,889,355.

Correspondingly the wafer orderbook mix buffer may be employed as a stand alone buffer, namely off-line in a production control or test area.

A computer controlled manufacturing system for fabricating semiconductor wafers into large scale integrated circuit devices and wherein each semiconductor wafer has scored, or recorded thereon, distinct identifying indicia, such as a machine readable serial number, said system comprising: a plurality of computer controlled concurrently operable semiconductor wafer processing stations, each of said stations being adapted to perform under computer control at least one discrete fabrication step; random access storage means having n storage cells, each of said storage cells being adapted to store at least one semiconductor wafer, each of said n storage cells of said random access storage means being individually and randomly addressable under computer control to receive for storage in any predetermined one of said n storage cells a semiconductor wafer, or to provide from storage in any predetermined one of said n storage cells a semiconductor wafer; reading means for reading the identifying indicia on said semiconductor wafers; conveying means operative under computer control, said conveying means interconnecting said plurality of computer controlled concurrently operable semiconductor wafer processing stations and said random access storage means, said conveying means being adapted to convey predetermined wafers to and from said random access storage means and selected ones of said processing stations; and a digital computer system operable under stored program control means, said computer system being interconnected with and controlling said processing stations, said random access storage means, said reading means and said conveying means, whereby under computer control selected ones of said semiconductor wafers randomly stored in said random access storage means may be selected and fabricated into first part number large scale integrated circuit devices, and selected second ones of said semiconductor wafers randomly stored in said random access storage means may be selected and fabricated into second part number large scale integrated circuit devices, where said first and second part number devices are not identical.

It is an object of the invention to provide an improved automated production control system for semiconductor wafer, handling, sorting and storage.

It is an object of the invention to provide an improved computer controlled manufacturing system for fabricating semiconductor wafers into large scale integrated circuit devices.

It is an object of the invention to provide random access storage means having a plurality of storage cells, each of said storage cells being adapted to store at least one semiconductor wafer and each of said plurality of storage cells being individually addressable under computer control.

It is an object of the invention to provide means for semiconductor wafer storage and sorting under real-time computer control.

It is an object of the invention to provide means for continuous environmental control of the wafers thereby preventing damage by human intervention.

It is an object of the invention to provide a wafer orderbook mix buffer sector for a multi-sectored computer controlled integrated circuit manufacturing system.

It is an object of the invention to provide improved means for part number sorting as well as quality level sorting within each part number.

It is an object of the invention to provide wafer cartridges adapted to store at least 50 semiconductor wafers and wherein each cartridge has a machine and man readable number.

The foregoing and other objects, features, and advantages of the invention will be apparent from the following more particular description of the preferred embodiment of the invention, as illustrated in the accompanying drawings, in which.

Figure 4:
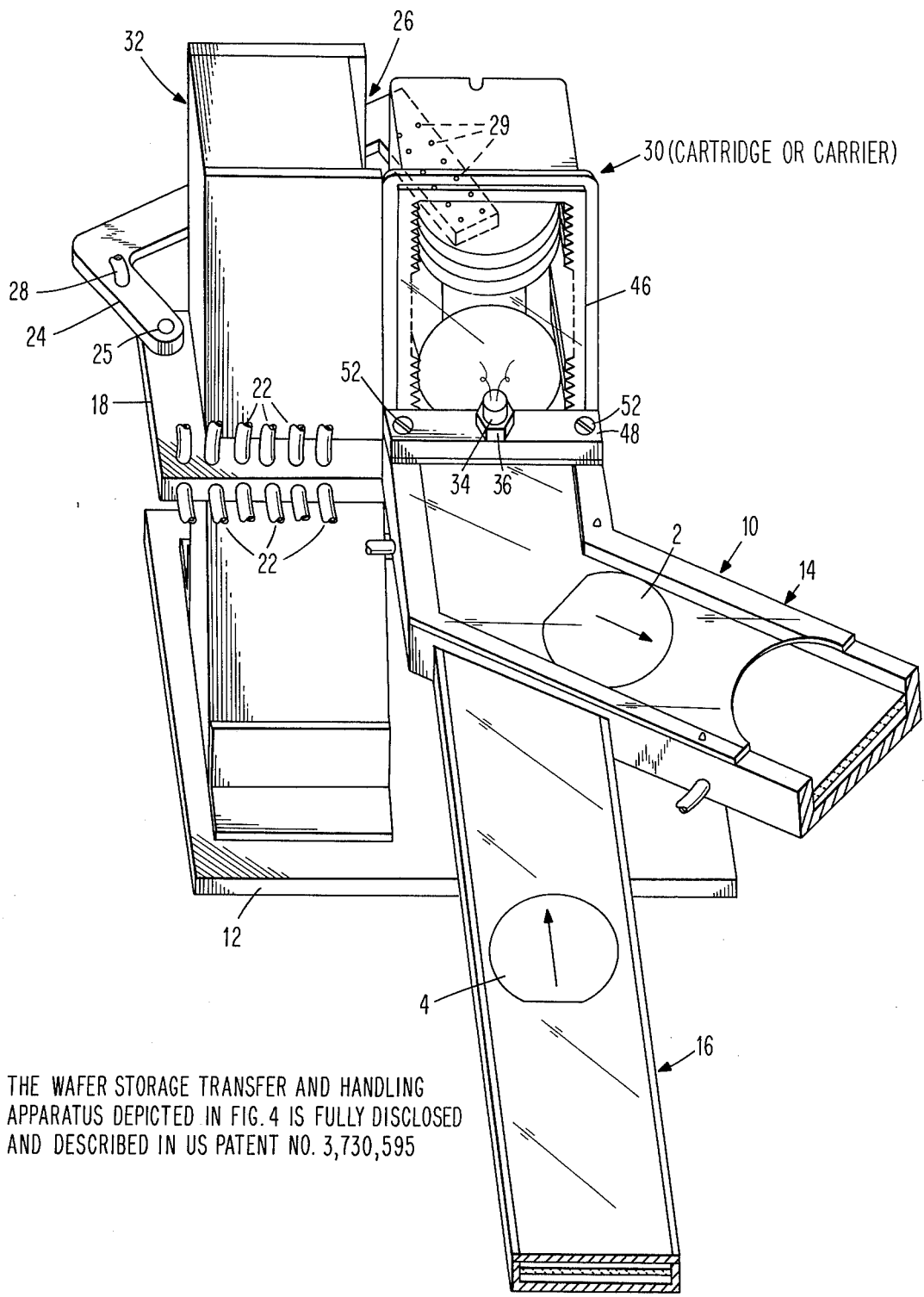

FIG. 4 is a schematic representation of wafer storage transfer and handling apparatus, generally of the type disclosed in U.S. Pat. No. 3,730,595, which may be employed in the practice of the invention.

DESCRIPTION OF THE PREFERRED EMBODIMENTS

Figure 1:
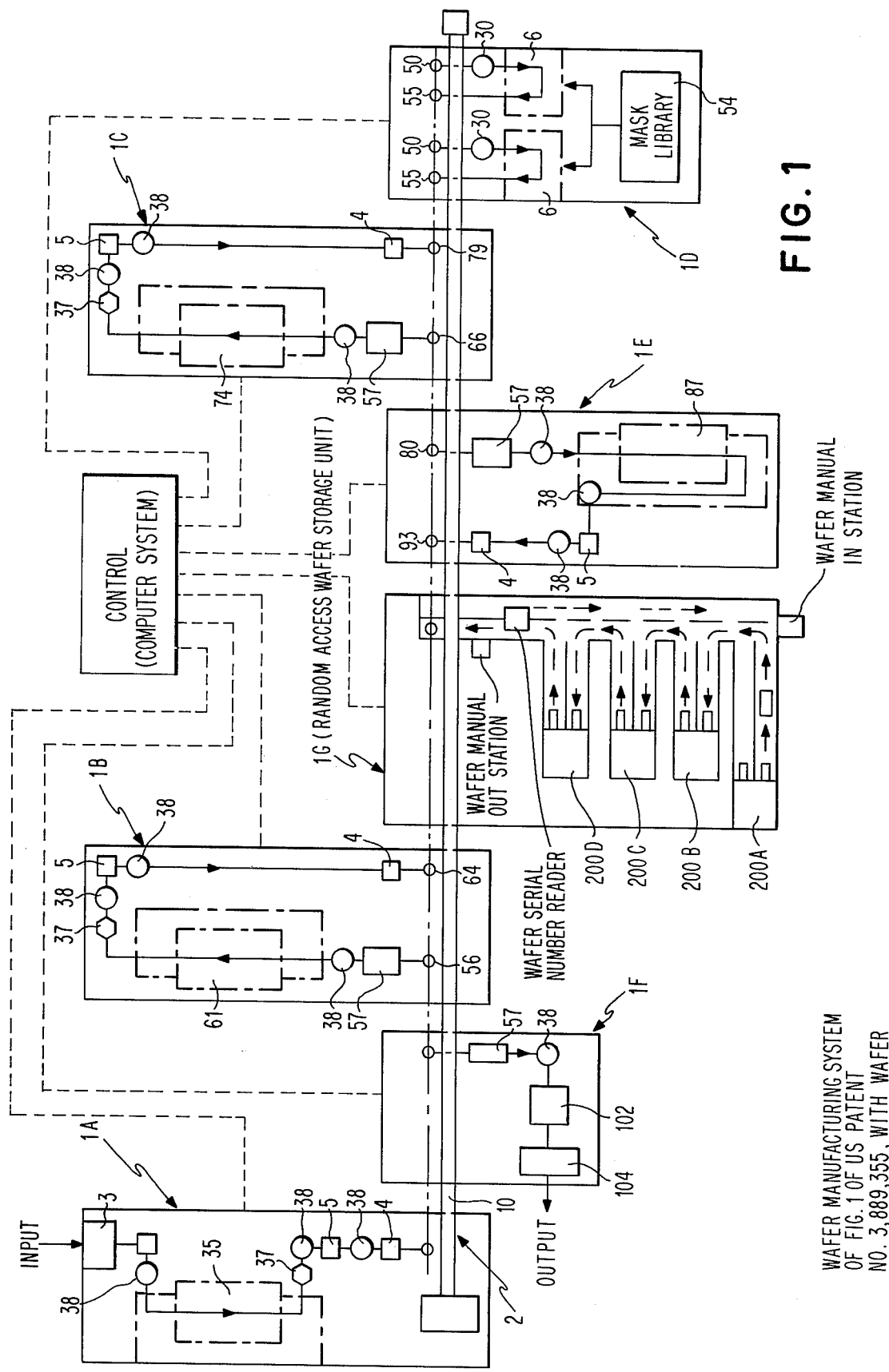
FIG. 1 is a diagrammatic representation in plan view of a computer controlled manufacturing system, in accordance with the invention, for fabricating semiconductor wafers into large scale integrated circuit devices.

Referring now to FIG. 1, an electronic component manufacturing system employing the invention is schematically illustrated. The manufacturing system includes processing stations or sectors 1A to 1F, generally of the type disclosed in U.S. Pat. No. 3,889,355. Each of the sectors comprise a set of wafer processing steps before and after which the semiconductor wafer may be stored for some period of time without degradation. Sectors 1A to 1F are in effect a wafer fabricating plant which accomplishes a set of processing steps, and which may have a temporary product storage unit at the output end. Although only six processing sectors, in addition to random access wafer storage unit sector 1G, are illustrated, is to be understood that as many wafer processing sectors as may be required may be employed.

In the manufacturing system as depicted in FIG. 1, each semiconductor wafer has a serial number encoded in the edge or kerf of the semiconductor wafer or slice. The manufacturing system includes a number of reading devices disposed appropriately throughout the system for reading the wafer serial number and conveying the number to the computer system which controls the manufacturing system. The technique of recording serial numbers on semiconductor wafers, the serial number reading devices and the conveying of the serial number to the computer system are all well within the present state of the art and no detailed discussion thereof is deemed necessary.

In accordance with the preferred embodiment of the invention in the component manufacturing system of FIG. 1, the Random Access Wafer Storage Unit (or Wafer Orderbook Mix Buffer) 1G stores a sizeable number of semiconductor wafers. The serial number, physical parameters, processing history, test data etc. for each semiconductor wafer stored in RAW storage unit 1G is contained within the memory of the computer system. The physical address or location of each wafer in the RAW Storage unit 1G is also stored in the memory of the computer system. More specifically for every semiconductor wafer in the manufacturing system, the computer system maintains an updated record of the wafer's process history, test data, and physical location within the system.

Thus, in accordance with the preferred embodiment of the invention, a semiconductor wafer (or wafers) having a particular process history (or test data) may be selected under computer control for processing in any predetermined sequence by one or more of the work process stations 1A to 1F. It will be apparent that the selected wafer (or wafers) may at time of selection be physically located anywhere within the manufacturing system, expressly including the RAW Storage Unit 1G.

The manufacturing system is entirely under computer control. Thus a computer is connected to the slice transporting portion of the system and operates to regulate the movement of slices to and from each of the work stations of the system. Also, the work stations in the various sectors are operated differently under control of the computer in order to provide optimum slice processing at each work station throughout the overall system.

In operation, as disclosed in detail in U.S. Pat. No. 3,889,355, semiconductor wafers are brought to the input position of each sector by the central transport unit 2. Upon sensing the presence of a wafer at an input position, the controls of that process sector cause the wafer to be processed through the entire sequence of steps incorporated in that particular sector, and after passing through the processing operation of that sector, the wafers are brought to the output position of that sector for pick-up by the central transport for transportation and transfer to the next required sector in a prescribed sequence of work sectors specified by the control unit regulating the movement of the transport. Selected wafer, or wafers, may, under computer control of the transport mechanism 2 and of the wafer conveying means of the RAW Storage Unit 1G be conveyed to and from addressable physical storage locations in the Random Access Wafer Storage Unit of sector 1G.

The semiconductor wafer processing sectors 1A, 1B, 1C, 1D, 1E, 1F and interconnecting central transport 2, as depicted in FIG. 1 are individually and in combination more fully described in U.S. Pat. No. 3,889,355. The semiconductor wafer processing sector 1G, in accordance with the preferred embodiment of the invention, and as described hereinabove and in detail hereinafter may be employed in an automated wafer fabricating system or as a stand alone wafer processing sector.

It is to be appreciated that the practice of applicants' invention is not limited to an automated wafer fabricator system of the type disclosed in U.S. Pat. No. 3,889,355. For example, as will be readily apparent to persons skilled in the art from the description and explanation of the operation of the preferred embodiment, the invention is not limited to any particular structure or system configuration. The computer controlled wafer fabricating system employed to practice applicants' invention is not limited to any particular structure or system configuration of wafer processing sectors. As evidenced by the relatively extensive citation of the prior art patents and publications directed to wafer handling, conveying, storing, etc., numerous structures for the practice of applicants' invention are available and known to the art.

Figure 2:
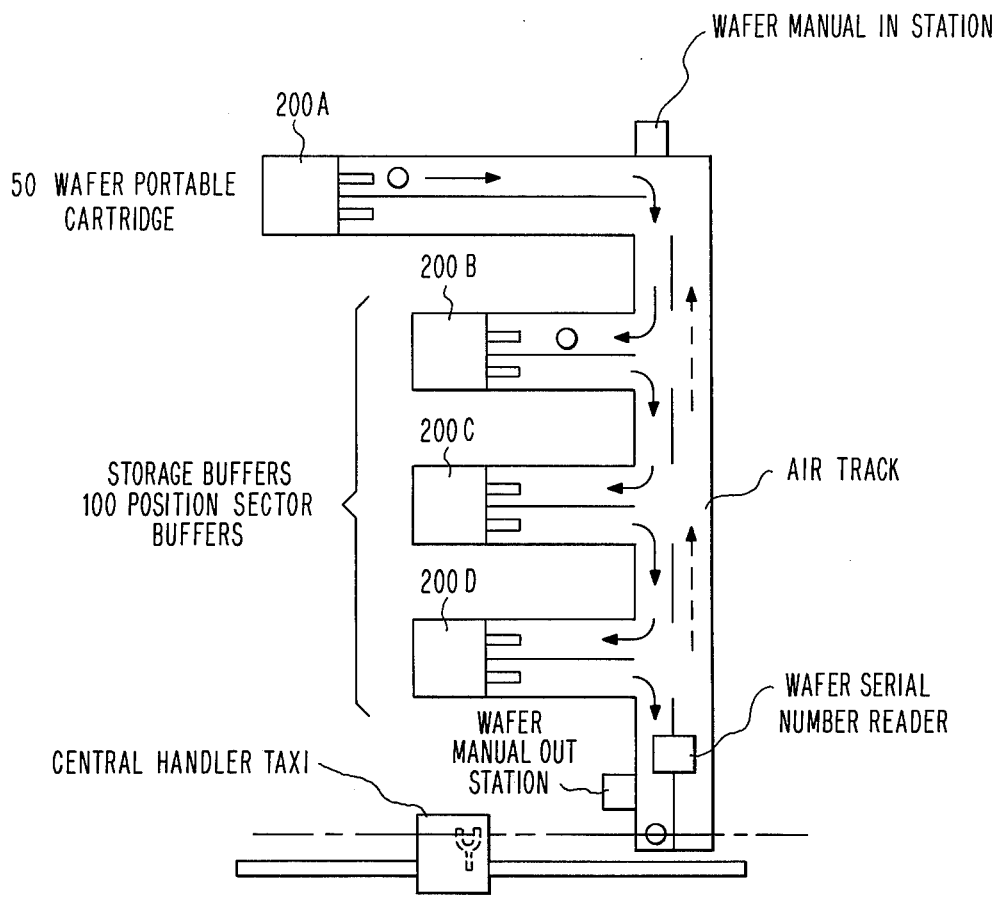
FIG. 2 is a schematic representation of a Wafer Orderbook Mix buffer, in accordance with the invention, for employment in an automated semiconductor wafer fabricator system.
Figure 3:
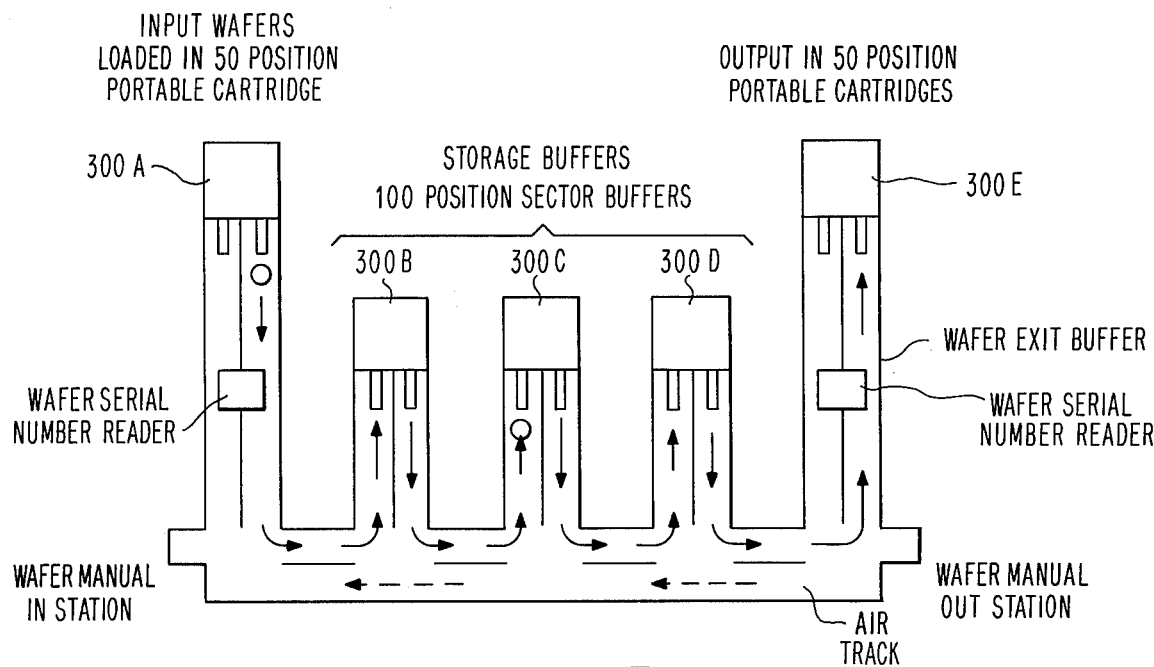
FIG. 3 is a schematic representation of an "off-line", or stand alone Wafer Orderbook Mix buffer in accordance with the invention.

The Wafer Orderbook Mix Buffer, or Random Access Wafer Storage Unit 1G of FIG. 1 is depicted in FIG. 2 in a preferred embodiment for employment as a segment, or sector, of a complete automated Wafer Fabricating system, whereas in FIG. 3 a preferred embodiment of an off-line or "stand alone" Wafer Orderbook Mix Buffer is depicted.

Reference is made to FIG. 2. A wafer Orderbook Mix Buffer configured as depicted in FIG. 2 operates in the following manner. Wafers with different master slice part numbers are graded and loaded into the 50 Wafer Portable Cartridge of Wafer Storage, Transfer and handling apparatus 200A. The apparatus 200A may be one of a number suitable structures known to the art. For example, the apparatus 200A, may be generally of the type disclosed and described in U.S. Pat. No. 3,730,595 and as depicted in FIG. 4 of the drawing. The wafers from the 50 position cartridge of 200A are then, under computer control, sent and stored according to the part number, grade, etc. in a predetermined one of the three storage buffers 200B, 200C and 200D. [It will be appreciated that the Wafer Orderbook Mix Buffer of FIG. 2 may have more than one input cartridge (200A) and it is not to be construed as limited to three storage buffers (200B, 200C and 200D)]. The buffers 200B, 200C and 200D may be of any suitable structure known to the art. The buffers 200B, 200C and 200D may be identical one to another or vary in capacity and structural design as dictated by overall system requirements. Buffers 200B, 200C and 200D may be generally of the type disclosed and described in U.S. Pat. No. 3,730,595 and as depicted in FIG. 4 of the drawing. Alternatively, Buffers 200B, 200C and 200D may respectively be generally of the type disclosed in U.S. Pat. No. 3,731,823, IBM Technical Disclosure Bulletin publication entitled "Air Track Buffer" by J. P. Babinski, Vol. 16, No. 2, July 1973, pages 469 and 470, or afore-identified U.S. Pat. No. 3,976,330 and application Ser. No. 618,655.

As stated supra the wafers from the cartridge of 200A are, under computer control, withdrawn from the unit 200A and in accordance with the part number and/or data of each wafer sent and stored in one of the buffers 200B, 200C and 200D. It is to be expressly understood throughout this discussion of the operation of the Wafer Orderbook Mix Buffer of FIG. 2, that at all times the computer system controls the movement of the wafers within the buffer of FIG. 2 and maintains by Serial Number (or the like) an updated data record for each wafer. This updated data record on a real time basis maintains a record of the physical storage location of the wafer in the buffer of FIG. 2, or the physical location of the wafer in the wafer fabricator system.

Referring to FIG. 2, the central Handler taxi is representative of structure which may be employed to convey wafers to and from the Wafer Orderbook Mix Buffer and the Wafer Fabricator processing sectors. It will be appreciated that the central Handler Taxi may be similar to central transport structure 2 of U.S. Pat. No. 3,889,355. Correspondingly, it will be appreciated that well known air slide type structures may be employed in lieu of the central handler Taxi depicted in FIG. 2.

Still referring to FIG. 2, upon demand, under program control of the computer system, a particular wafer, or particular wafers, may be selected from storage in the Wafer Orderbook Mix Buffer. The serial number of the selected wafer (or wafers) will be verified by the serial number reader. The selected wafer or wafers will then be transported, under computer control and via suitable wafer conveying means (such as a rising pedestal, central Wafer Handler Taxi, etc.) to the appropriate processing sector of the wafer fabricating system.

Referring to FIG. 2, although only one Wafer Serial Number Reader is diagrammatically depicted it will be appreciated that more than one appropriately placed Wafer Serial Number Readers may be employed in the Wafer Orderbook Mix Buffer. Also as depicted in FIG. 2, at least one "Wafer Manual In station" and at least one "Wafer Manual Out Station" is provided in the Wafer Orderbook Mix Buffer.

The "Wafer Manual In station" and the "Wafer Manual Out Station" respectively provide a means of manually entering and removing single wafers.

Reference is made to FIG. 3, wherein the configuration of an "off-line" or stand alone Wafer Orderbook Mix Buffer is depicted. It will be noted "on line" (FIG. 2) and "off-line" (FIG. 3) Wafer Orderbook Mix Buffers are closely related in configuration. Referring to FIG. 3, it will be seen that the buffer has a wafer storage, transfer and handling apparatus 300A serving as an input and a wafer storage, transfer and handling apparatus 300E serving as an output. Apparatus 300A and apparatus 300E, each include a 50 position detachable (portable) cartridge. The apparatus 300A and 300E may respectively be generally of the type disclosed and described in U.S. Pat. No. 3,730,595 and as depicted in FIG. 4 of the drawing. Storage buffers 300B, 300C and 300D may be of any suitable structure known to the art. The buffers 300B, 300C and 300D may be identical one to another or vary in capacity and structural design. Buffers 300B, 300C and 300D may be generally of the type disclosed and described in U.S. Pat. No. 3,731,823, IBM TDB publication entitled "Air Track Buffer" by J. P. Babinski, Vol. 16, No. 2, July 1973, pages 469 and 470, or aforeidentified U.S. Pat. No. 3,976,330 and application Ser. No. 618,655. It will also be understood that additional buffers of the 300B to 300D type may be employed in the Wafer Orderbook Mix Buffer of FIG. 3.

Referring to FIG. 3, wafers are withdrawn under computer control from the cartridge of 300A, and in accordance with part number and/or data of each wafer, sent and stored in one of the buffers 300B, 300C and 300D. Corresponding, under computer control, selected wafers from the buffers 300A, 300B, 300C and 300D may be accumulated in the output cartridge of buffer 300E. It is to be expressly understood throughout this discussion of the operation of the Wafer Orderbook Mix Buffer of FIG. 3, that at all times the computer system controls the movement of the wafers within the buffer of FIG. 3, and maintains by serial number (or the like) an updated data record for each wafer. This updated data record on a real time basis maintains a record of the physical storage location of the wafer in the buffer of FIG. 3.

In FIG. 4, there is illustrated schematically one form of the linear carrier sender and receiver machine, for transferring wafers between a magazine and a dual air slide by means of a wafer ejector acceptor drive mechanism. Reference 10 is a bidirectional air slide assembly set on base 12 which carries wafers between a work station (not shown) and an indexing carrier or magazine 30. Bidirectional air slide assembly 10 consists of a feed air slide 14 which sends wafers from the carrier 30 positioned above a return air slide 16 which returns wafers 4 to the carrier from a work station. Various light shields are provided to filter out any light that could damage the wafers.

The apparatus depicted in FIG. 4 is disclosed and described in complete detail in U.S. Pat. No. 3,730,595 granted May 1, 1973 to Carl Yakubowski, and of common assignee with this application.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A computer controlled manufacturing system for fabricating semiconductor wafers into large scale integrated circuit devices and wherein each semiconductor wafer has stored, or recorded thereon, distinct identifying indicia, such as a machine readable serial number, said system comprising:

a plurality of computer controlled concurrently operable semiconductor wafer processing stations, each of said stations being adapted to perform under computer control at least one discrete fabrication step;

random access storage means having $n$ storage cells, each of said storage cells being adapted to store at least one semiconductor wafer, each of said $n$ storage cells of said random access storage means being individually and randomly addressable under computer control to receive for storage in any predetermined one of said $n$ storage cells a semiconductor wafer, or to provide from storage in any predetermined one of said $n$ storage cells a semiconductor wafer;

reading means for reading the identifying indicia on said semiconductor wafers;

conveying means operative under computer control, said conveying means interconnecting said plurality of computer controlled concurrently operable semiconductor wafer processing stations, and said random access storage means, said conveying means being adapted to convey predetermined wafers to and from said random access storage means and selected ones of said processing stations;

and a digital computer system operable under stored program control means, said computer system being interconnected with and controlling said processing stations, said random access storage means, said reading means and said conveying means, whereby under computer control selected ones of said semiconductor wafers randomly stored in said random access storage means may be selected and fabricated into first part number large scale integrated circuit devices, and selected second ones of said semiconductor wafers randomly stored in said random access storage means may be selected and fabricated into second part number large scale integrated circuit devices, where said first and second part number devices are not identical.

2. In a computer controlled manufacturing system for fabricating semiconductor wafers into large scale integrated circuit devices and wherein each semiconductor wafer has stored, or recorded thereon, distinct identifying indicia, such as a machine readable serial number, said system comprising:

a plurality of computer controlled concurrently independently operable semiconductor wafer processing sectors, each of said sectors being adapted to perform under computer control at least one discrete processing step;

Wafer Orderbook Mix buffer means for storing $m$ semiconductor wafers where $m$ is a positive integer greater than 10, said wafer orderbook mix buffer being addressable under computer control to provide from storage any predetermined one of said $m$ semiconductor wafers, whereby under computer control selected ones of said $m$ semiconductor wafers stored in said wafer orderbook mix buffer means may be selected and fabricated into first part number large scale integrated circuit devices, and selected second ones of said semiconductor wafers stored in said wafer orderbook means may be selected and fabricated into second part number large scale integrated circuit devices, where said first and second part number devices are not identical.

3. A computer controlled Wafer Orderbook Mix buffer, said buffer comprising:

$m$ storage cells, each of said $m$ storage cells being adapted to store a single semiconductor wafer;

first means operable under computer control for conveying a semiconductor wafer from an input station to any predetermined one of said $m$ storage cells;

said second means operable under computer control for conveying a semiconductor wafer from any predetermined one of said $m$ storage cells to any other unoccupied one of said $m$ storage cells, or to an output station, whereby said wafer orderbook mix buffer may be directed under computer program control to sort semiconductor wafers in accordance with one or more sort criteria, such as individual wafer test data.

4. A computer controlled wafer orderbook mix buffer as recited in claim 3, and wherein said buffer constitutes a real time operable sector in a multi-sectored computer controlled automated wafer fabricating system.

5. A computer controlled Wafer Orderbook Mix buffer as recited in claim 4 wherein said buffer includes at least one detachable portable multi-position wafer cartridge.

6. In a computer controlled manufacturing system for fabricating semiconductor wafers into large scale integrated circuit devices said system including:

random access storage means having $n$ storage cells, each of said storage cells being adapted to store at least one semiconductor wafer, each of said $n$ storage cells of said random access storage means being individually and randomly addressable under computer control to receive for storage in any predetermined one of said $n$ storage cells a semiconductor wafer, or to provide from storage in any predetermined one of said $n$ storage cells a semiconductor wafer, whereby under computer control selected ones of said semiconductor wafers randomly stored in said random access storage means may be selected and fabricated into large scale integrated circuit devices of a first type and selected second ones of said semiconductor wafers randomly stored in said random access storage means may be selected and fabricated into large scale integrated circuit devices of a second type.

7. In a computer controlled manufacturing system for fabricating semiconductor wafers into large scale integrated circuit devices as recited in claim 6, wherein said random access storage means includes at least one detachable portable semiconductor wafer multi-position wafer cartridge.

8. In a computer controlled manufacturing system for fabricating semiconductor wafers into large scale integrated circuit devices as recited in claim 6 wherein under program control of said computer system said random access storage means may be employed to sort into two or more lots a plurality of semiconductor wafers.

* * * * *

UNITED STATES PATENT OFFICE
CERTIFICATE OF CORRECTION

PATENT NO. : 4,027,246
DATED : May 31, 1977
INVENTOR(S) : Paul P. Castrucci, George A. Caccoma and William O. Druschel It is certified that error appears in the above-identified patent and that said Letters Patent are hereby corrected as shown below:

| | |
|---|---|
| Col. 1, line 26 | "In" should read -- If-- |
| Col. 4, line 10 | "file" should read --filed-- |
| Col. 4, line 23 | "yakubowski" should read --Yakubowski-- |
| Col. 9, line 60 | "station" should read --Station-- |
| Col. 9, line 63 | "station" should read --Station-- |
| Col. 12, line 13 | "said" should read --and-- |

Signed and Sealed this

Twenty-second Day of August 1978

[SEAL]

Attest:

RUTH C. MASON
Attesting Officer

DONALD W. BANNER
Commissioner of Patents and Trademarks